(12) United States Patent
Nanba

(10) Patent No.: US 8,085,478 B2
(45) Date of Patent: Dec. 27, 2011

(54) ZOOM LENS SYSTEM AND IMAGE PICKUP APPARATUS INCLUDING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/749,375

(22) Filed: Mar. 29, 2010

(65) Prior Publication Data

US 2010/0246026 A1    Sep. 30, 2010

(30) Foreign Application Priority Data

Mar. 31, 2009   (JP) ................................. 2009-085554

(51) Int. Cl.
*G02B 15/14* (2006.01)
(52) U.S. Cl. ........................................ 359/682; 359/689
(58) Field of Classification Search .................. 359/676, 359/682, 689, 695
See application file for complete search history.

(56) References Cited

U.S. PATENT DOCUMENTS

| | | | |
|---|---|---|---|
| 6,498,687 B1 | 12/2002 | Sekita et al. | |
| 6,822,808 B2 | 11/2004 | Nanba et al. | |
| 7,113,347 B2 | 9/2006 | Nanba et al. | |
| 7,215,483 B2 | 5/2007 | Sekita | |
| 7,295,381 B2 | 11/2007 | Ito | |
| 7,333,275 B2 | 2/2008 | Sekita | |
| 2010/0060993 A1* | 3/2010 | Kanai et al. | 359/689 |
| 2010/0265594 A1* | 10/2010 | Matsui et al. | 359/682 |

FOREIGN PATENT DOCUMENTS

| | | |
|---|---|---|
| CN | 101666906 A | 3/2010 |
| JP | 2004-061675 A | 2/2004 |

\* cited by examiner

*Primary Examiner* — Alciai M Harrington

(57) ABSTRACT

Provided is a compact and high optical performance zoom lens system, including, in order of from an object side toward an image side: a first lens unit with a negative refractive power; a second lens unit with a positive refractive power; and a third lens unit with the positive refractive power, the first, second, and third lens units moving to perform zooming. The first lens unit includes a first lens element with the negative refractive power, and a second lens element with the positive refractive power in order of from the object side toward the image side, and in which a refractive index of a material of the first lens element (N11), an Abbe number of a material of the second lens element (v12), and the radii of curvatures of lens surfaces of the first lens element on the object side and the image side (R11a, R11b) are appropriately set.

12 Claims, 11 Drawing Sheets

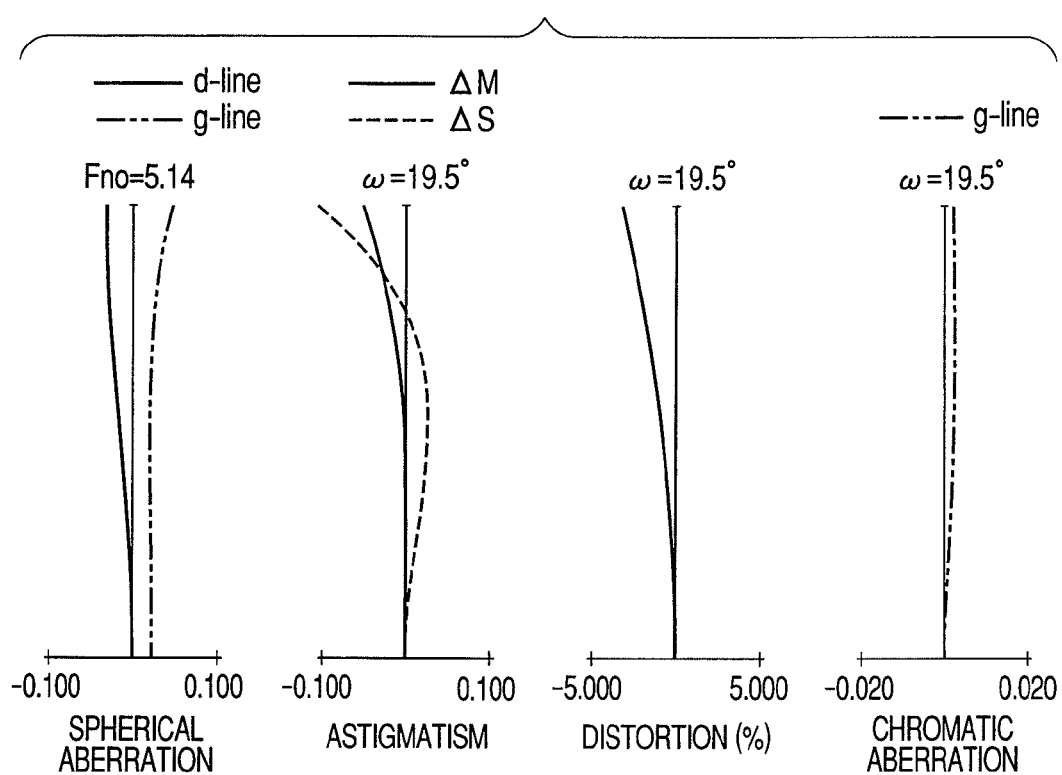
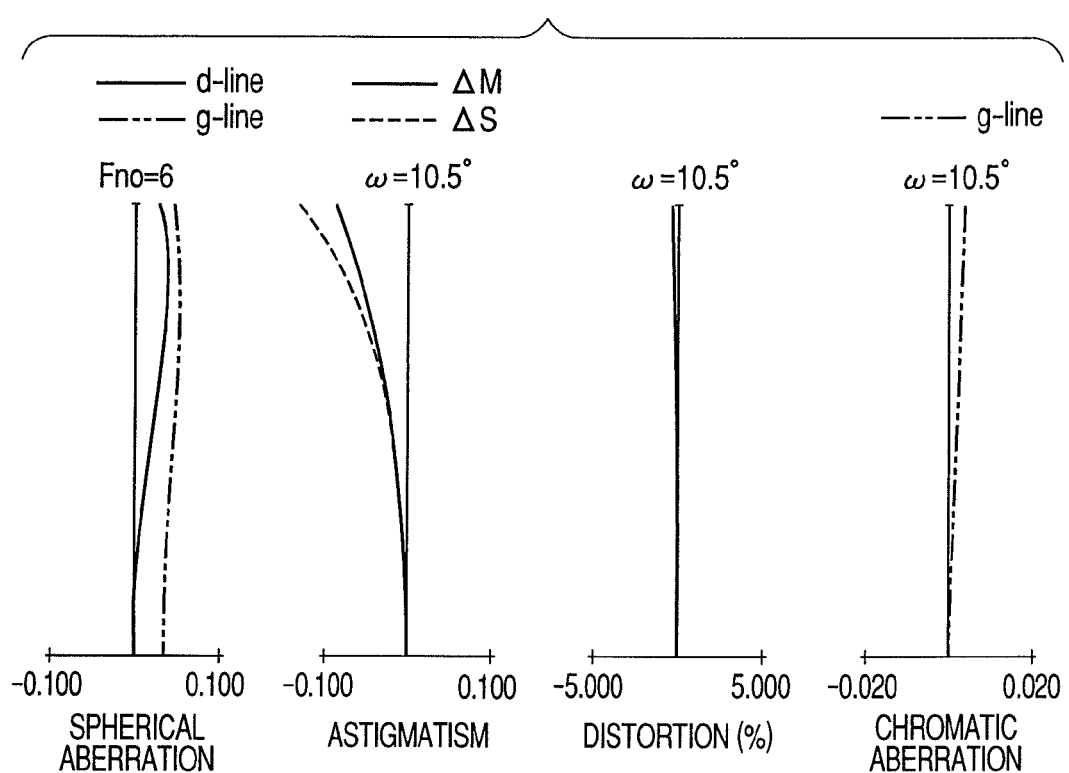

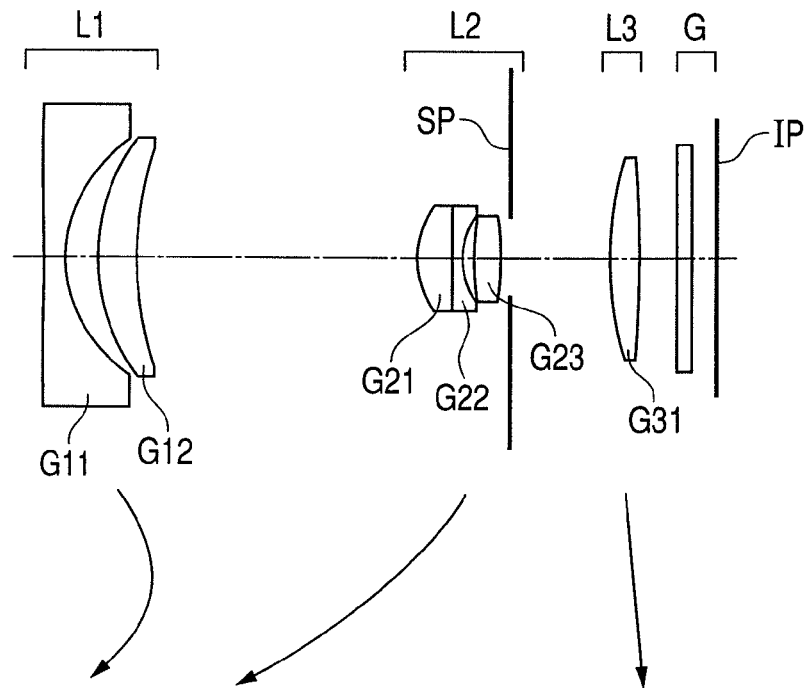
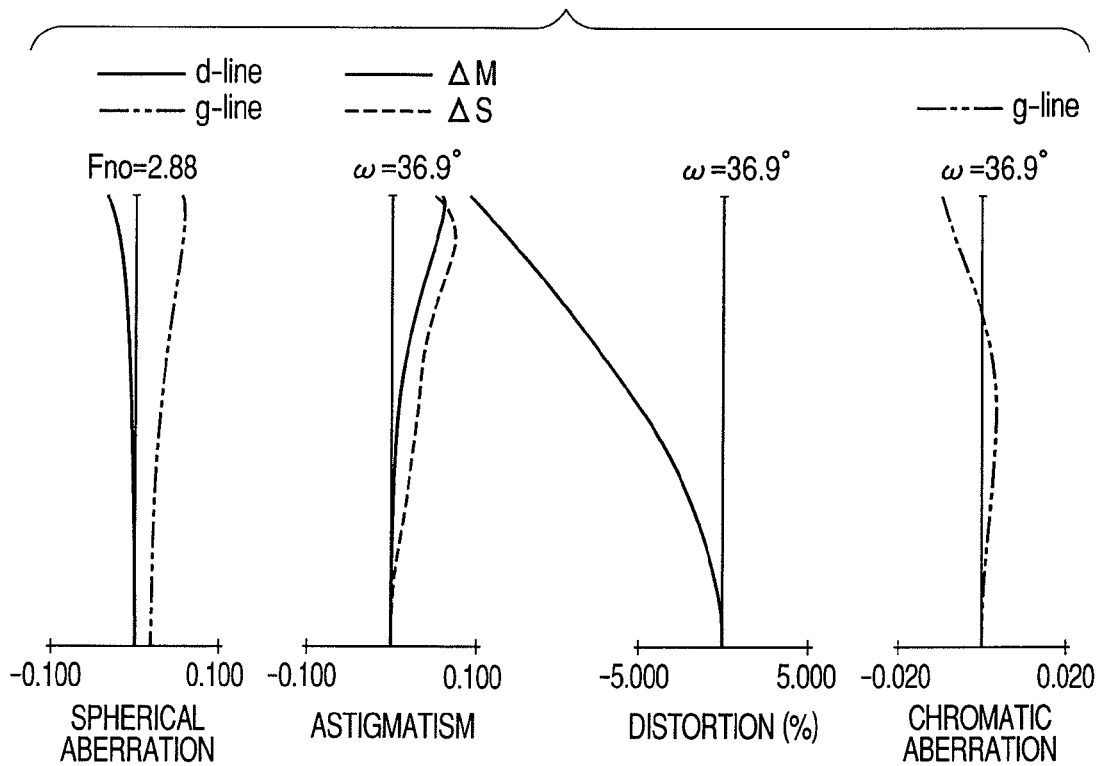

ZOOM LENS SYSTEM AND IMAGE PICKUP APPARATUS INCLUDING THE SAME

BACKGROUND OF THE INVENTION

1. Field of the Invention

The present invention relates to a zoom lens system, and more particularly, to a zoom lens system suitable for an image pickup apparatus such as a digital still camera or a video camera.

2. Description of the Related Art

The zoom lens systems for use in digital cameras, digital video cameras, and the like have been demanded to provide a wide field angle, a high zoom ratio, a compact size, and a high optical performance.

In cameras (image pickup apparatus) each using a solid-state image pickup element, diverse optical members such as a low-pass filter or a chromatic correction filter are disposed between a lens end portion and the solid-state image pickup element. For that reason, the zoom lens systems used in those image pickup apparatuses have been demanded to provide a long back focus. Further, in order to prevent color shading, the zoom lens systems have been demanded to provide an excellent telecentric characteristic on an image side.

As an optical system configured to easily ensure the back focus, there is a negative-lead zoom lens system in which a lens unit with a negative refractive power is disposed closest to the object side.

A zoom lens system has been known which is downsized and telecentric on the image side, and includes a first lens unit with a negative refractive power, a second lens unit with a positive refractive power, and a third lens unit with the positive refractive power arranged in order of from the object side toward the image side (U.S. Pat. No. 6,822,808, U.S. Pat. No. 6,498,687, Japanese Patent Application Laid-Open No. 2004-61675, U.S. Pat. No. 7,333,275, U.S. Pat. No. 7,215,483, U.S. Pat. No. 7,113,347, U.S. Pat. No. 7,295,381).

In order to obtain a high optical performance high in the entire zoom range while downsizing the entire system in the zoom lens system including those three units, it is important to appropriately set the lens configurations of the respective lens units.

In particular, it is important to appropriately set the configuration and material of the respective lenses that constitute the first lens unit so as to reduce a variation in various aberrations caused by zooming.

SUMMARY OF THE INVENTION

A zoom lens system according to the present invention includes, in order of from an object side toward an image side: a first lens unit with a negative refractive power; a second lens unit with a positive refractive power; and a third lens unit with the positive refractive power, the first lens unit, the second lens unit, and the third lens unit moving to perform zooming, in which the first lens unit includes a first lens element with the negative refractive power, and a second lens element with the positive refractive power in order of from the object side toward the image side, and in which when a refractive index of a material of the first lens element is N11, an Abbe number of a material of the second lens element is v12, and the radii of curvatures of lens surfaces of the first lens element on the object side and the image side are R11a and R11b, respectively, the following conditions are satisfied:

$1.81 < N11;$ $v12 < 20.0;$ and $0 < (R11a + R11b)/(R11a - R11b) \leq 1.0.$

The present invention may realize a zoom lens system that is compact in the entire lens system and provides a high optical performance over the entire zoom range, and an image pickup apparatus including the zoom lens system.

Further features of the present invention will become apparent from the following description of exemplary embodiments with reference to the attached drawings.

BRIEF DESCRIPTION OF THE DRAWINGS

FIGS. 2A, 2B, and 2C are aberration graphs in the zoom lens system according to the first embodiment of the present invention.

FIG. 9 is an optical cross-sectional view illustrating a zoom lens system according to a fifth embodiment of the present invention.

FIGS. 10A, 10B, and 10C are aberration graphs in the zoom lens system according to the fifth embodiment of the present invention.

DESCRIPTION OF THE EMBODIMENTS

A zoom lens system according to the present invention includes a first lens unit with a negative refractive power, a second lens unit with a positive refractive power, and a third lens unit with the positive refractive power, which are arranged in order of from an object side toward an image side, and move the respective lens units to perform zooming.

Figure 1:
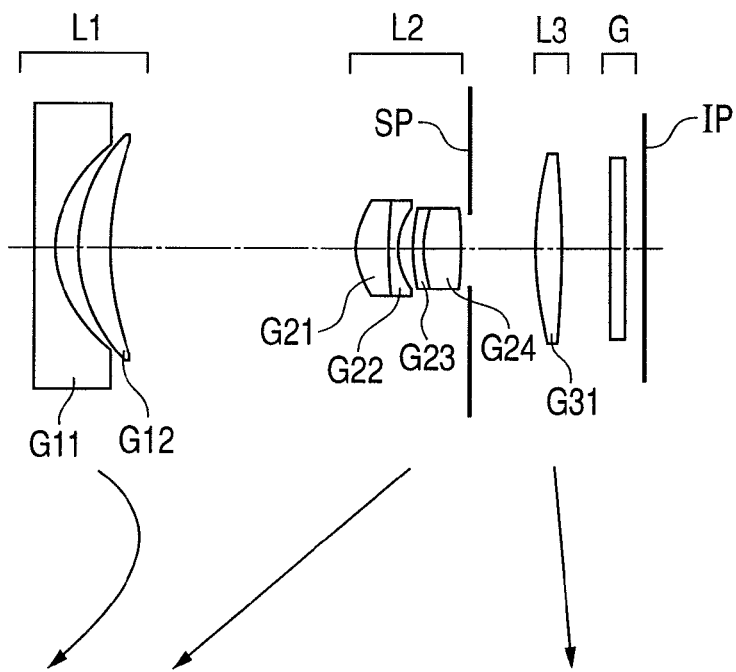
FIG. 1 is an optical cross-sectional view illustrating a zoom lens system according to a first embodiment of the present invention.
Figure 2A:
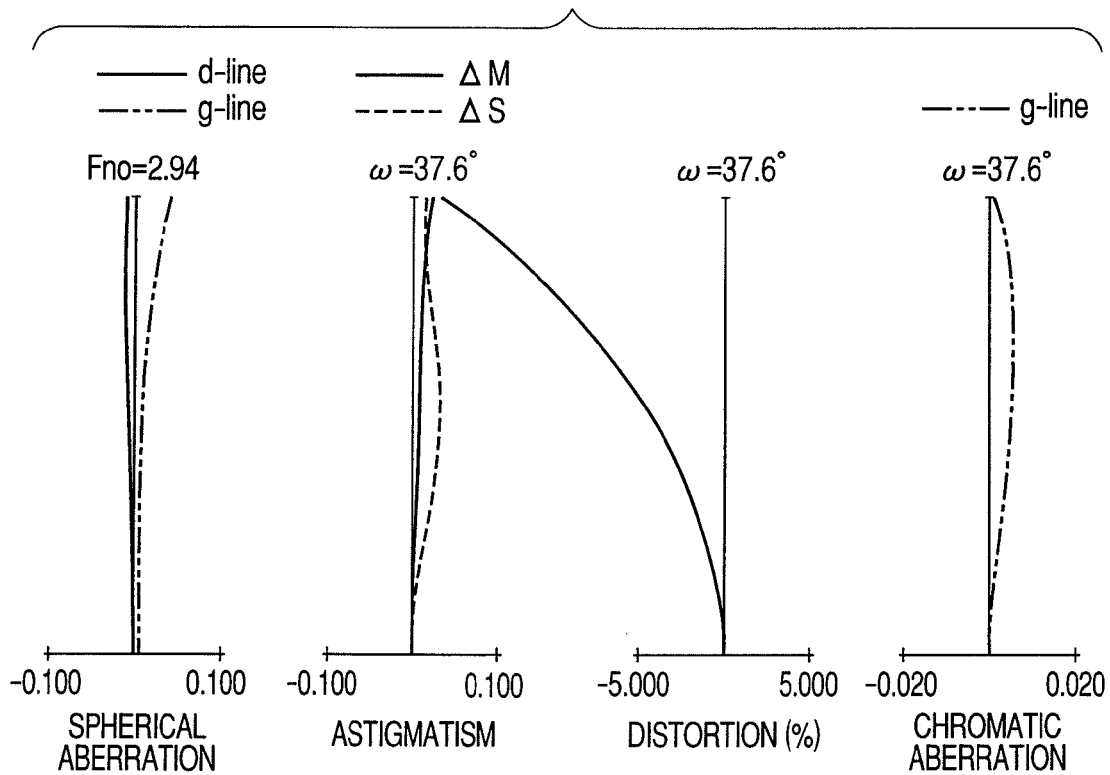
Figure 3:
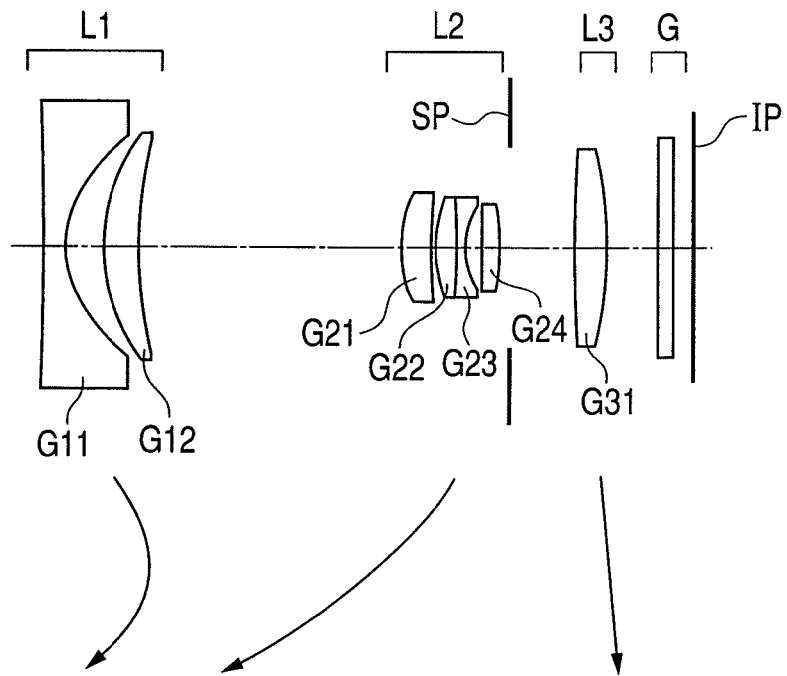
FIG. 3 is an optical cross-sectional view illustrating a zoom lens system according to a second embodiment of the present invention.
Figure 4A:
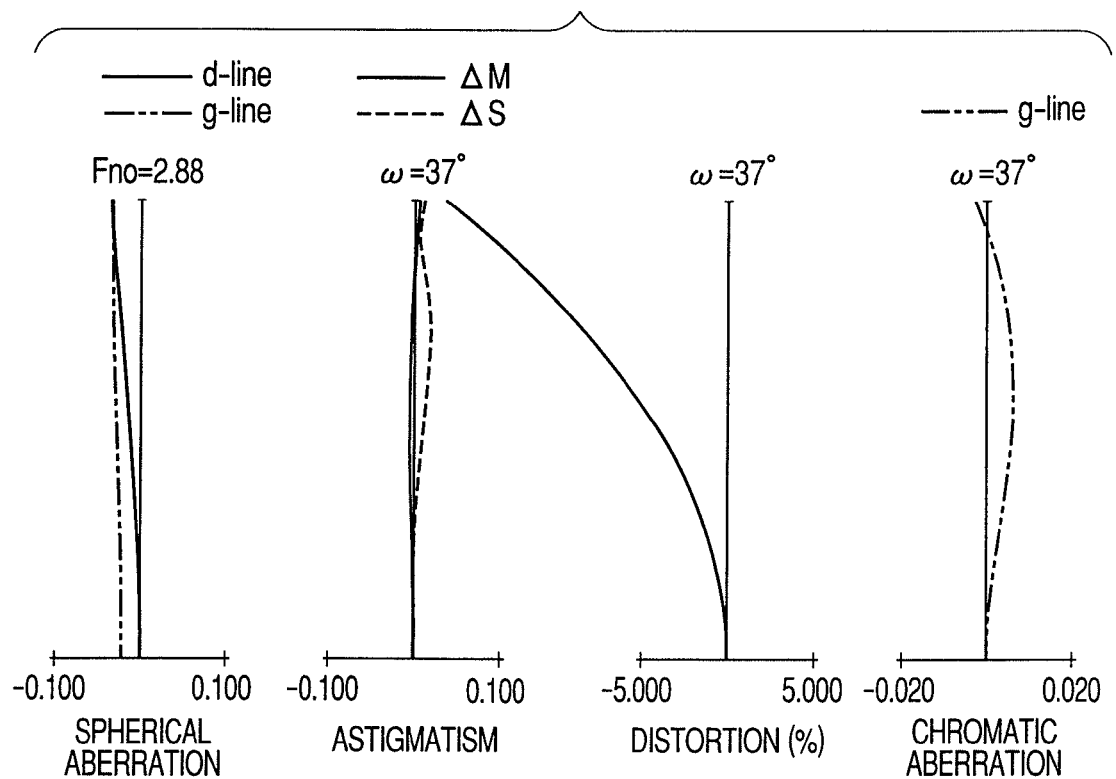
FIGS. 4A, 4B, and 4C are aberration graphs in the zoom lens system according to the second embodiment of the present invention.
Figure 4B:
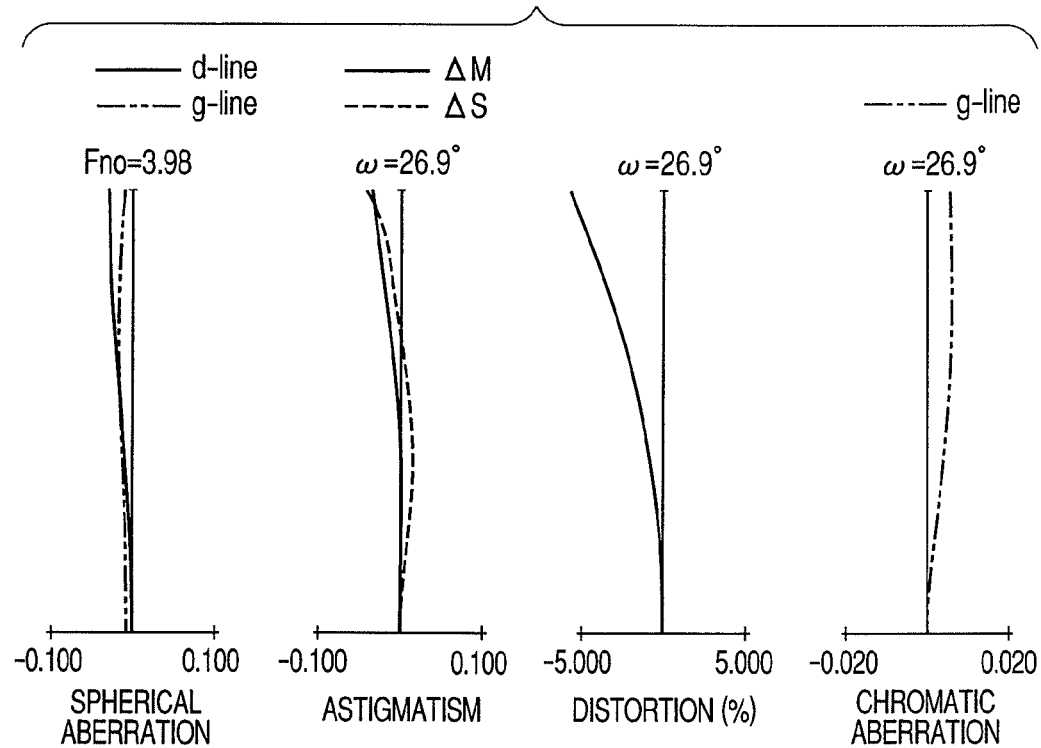
Figure 4C:
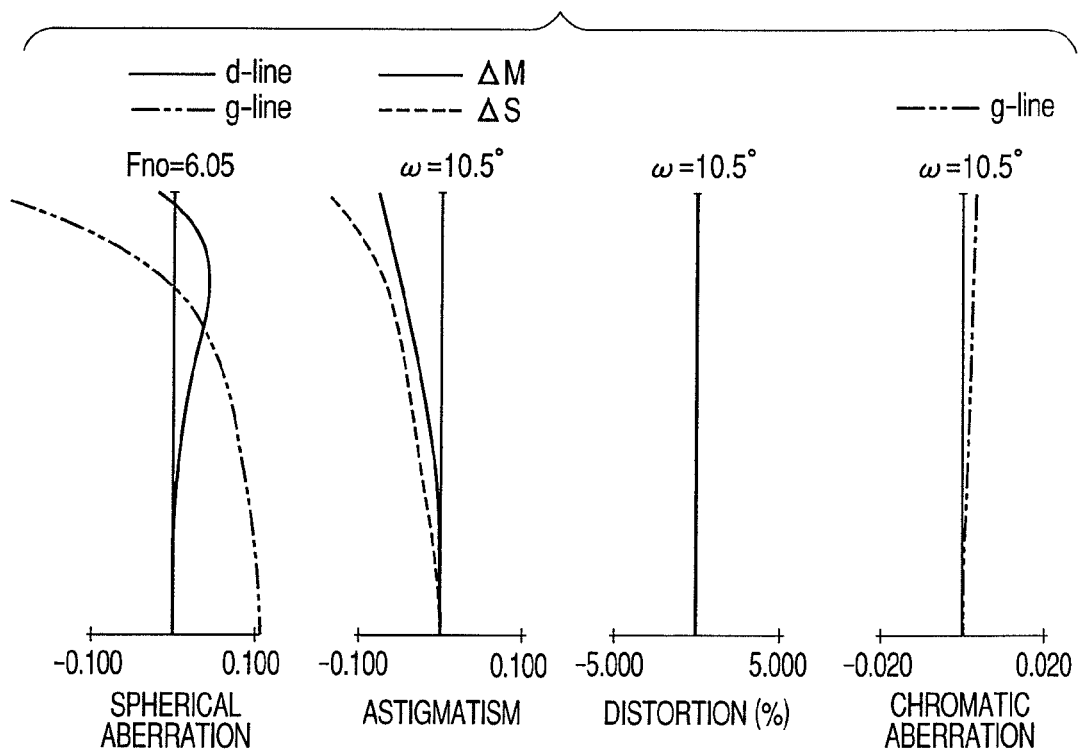

FIG. 1 is a lens cross-sectional view illustrating a zoom lens system according to a first embodiment of the present invention at a wide angle end (short-focal length end). FIGS. 2A, 2B, and 2C are aberration graphs in the zoom lens system according to the first embodiment at the wide angle end, an intermediate zoom position, and a telephoto end (long-focal length end), respectively. The first embodiment shows a zoom lens system that is about 4.71 in zoom ratio and about 2.94 to 6.00 in aperture ratio. FIG. 3 is a lens cross-sectional view of a zoom lens system according to a second embodiment of the present invention at the wide angle end. FIGS. 4A, 4B, and 4C are aberration graphs in the zoom lens system according to the second embodiment at the wide angle end, the intermediate zoom position, and the telephoto end, respectively. The second embodiment shows the zoom lens system that is about 4.72 in zoom ratio and about 2.88 to 6.05 in aperture ratio.

Figure 5:
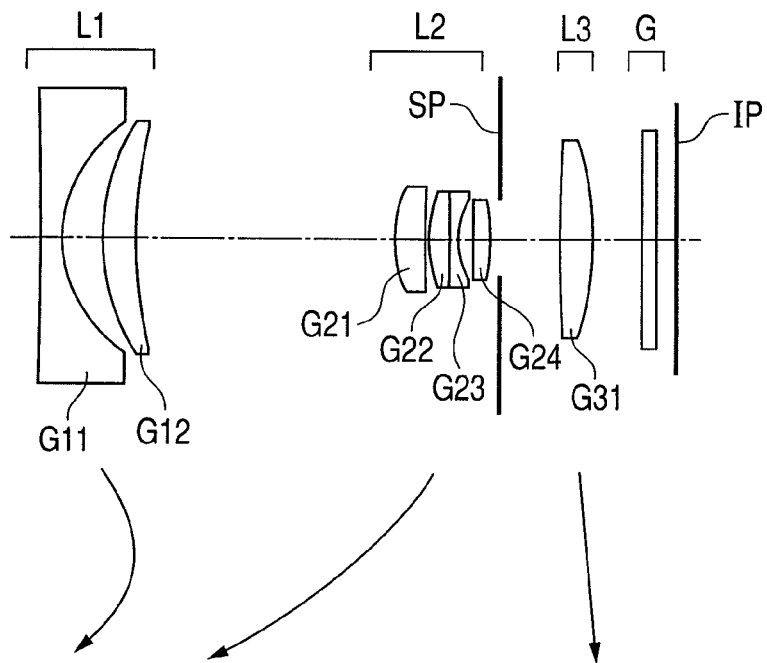
FIG. 5 is an optical cross-sectional view illustrating a zoom lens system according to a third embodiment of the present invention.
Figure 6A:
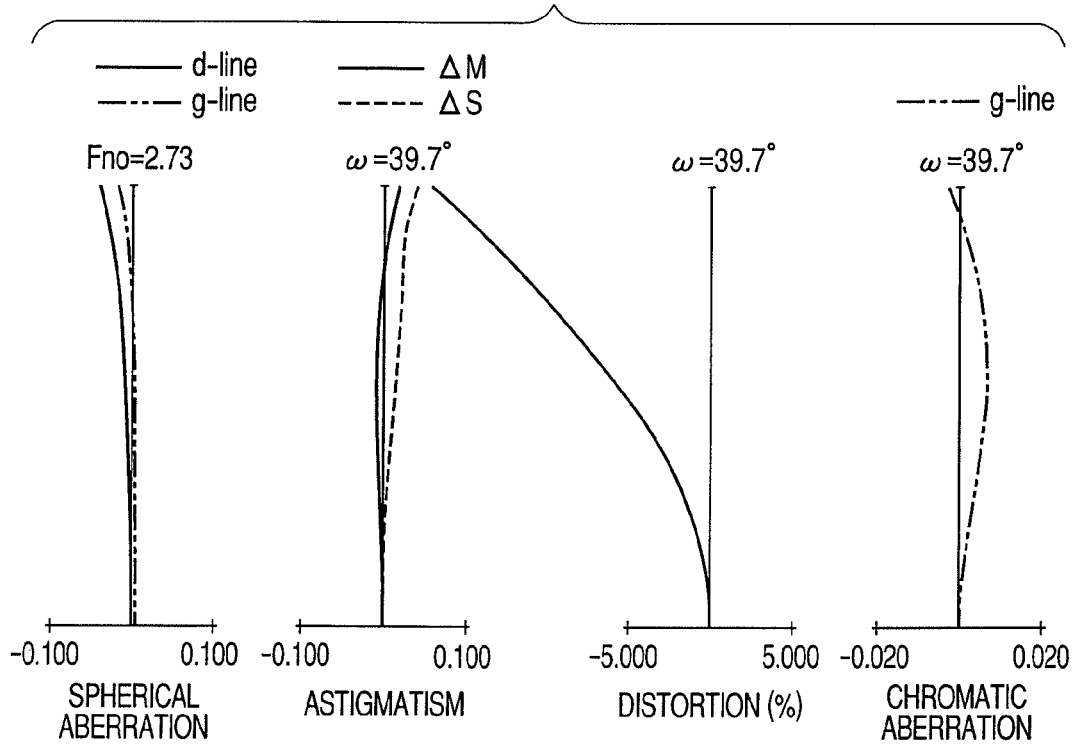
FIGS. 6A, 6B, and 6C are aberration graphs in the zoom lens system according to the third embodiment of the present invention.
Figure 6B:
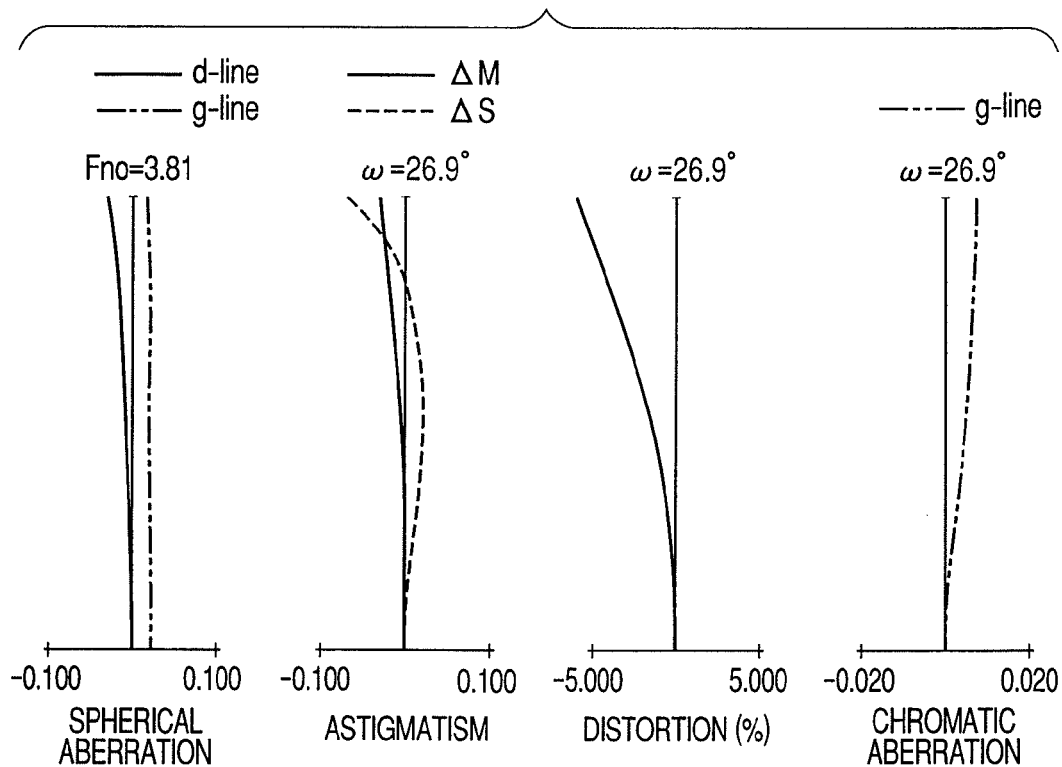
Figure 6C:
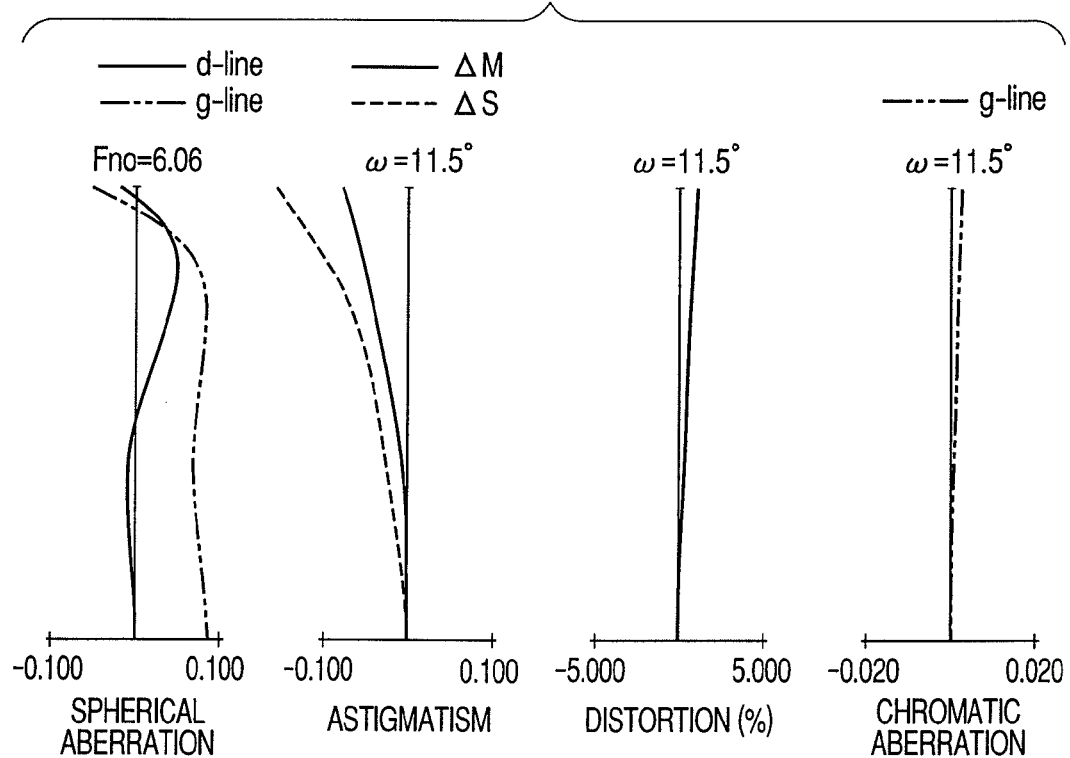
Figure 7:
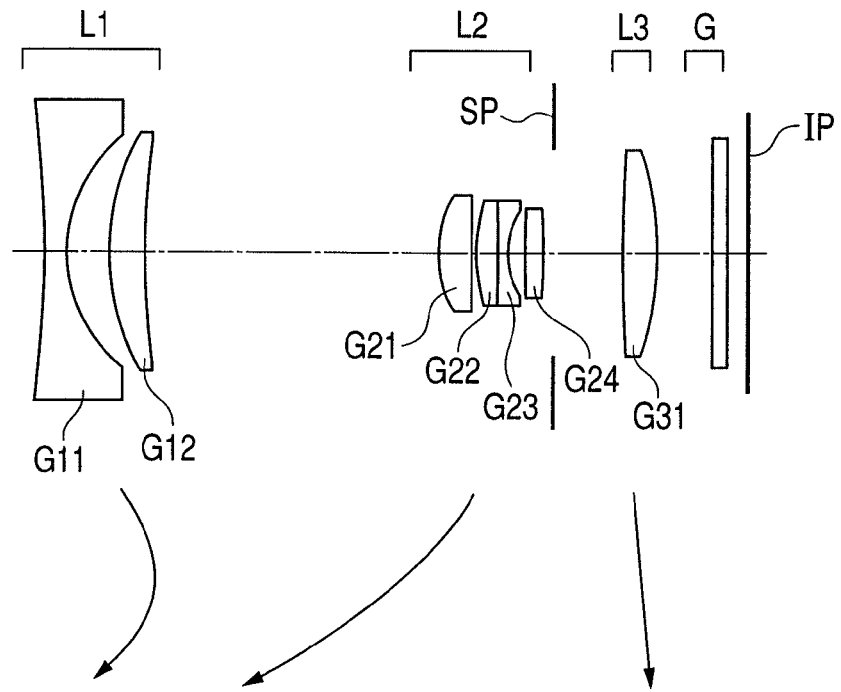
FIG. 7 is an optical cross-sectional view illustrating a zoom lens system according to a fourth embodiment of the present invention.
Figure 8A:
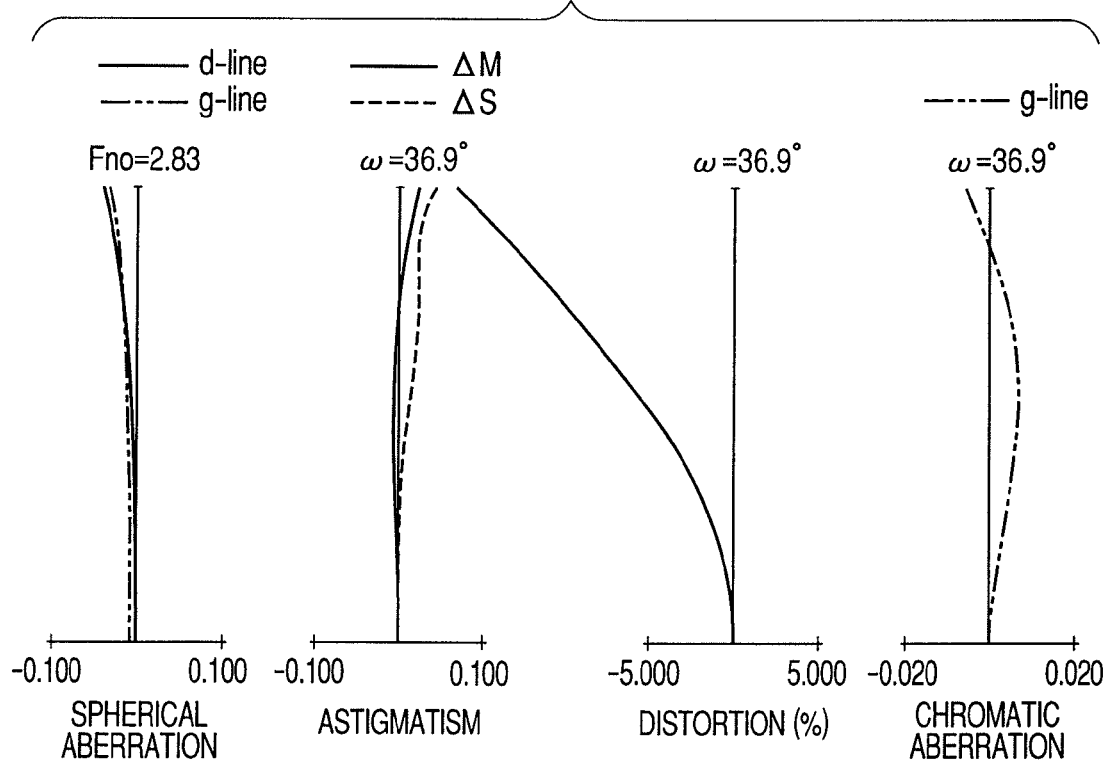
FIGS. 8A, 8B, and 8C are aberration graphs in the zoom lens system according to the fourth embodiment of the present invention.
Figure 8B:
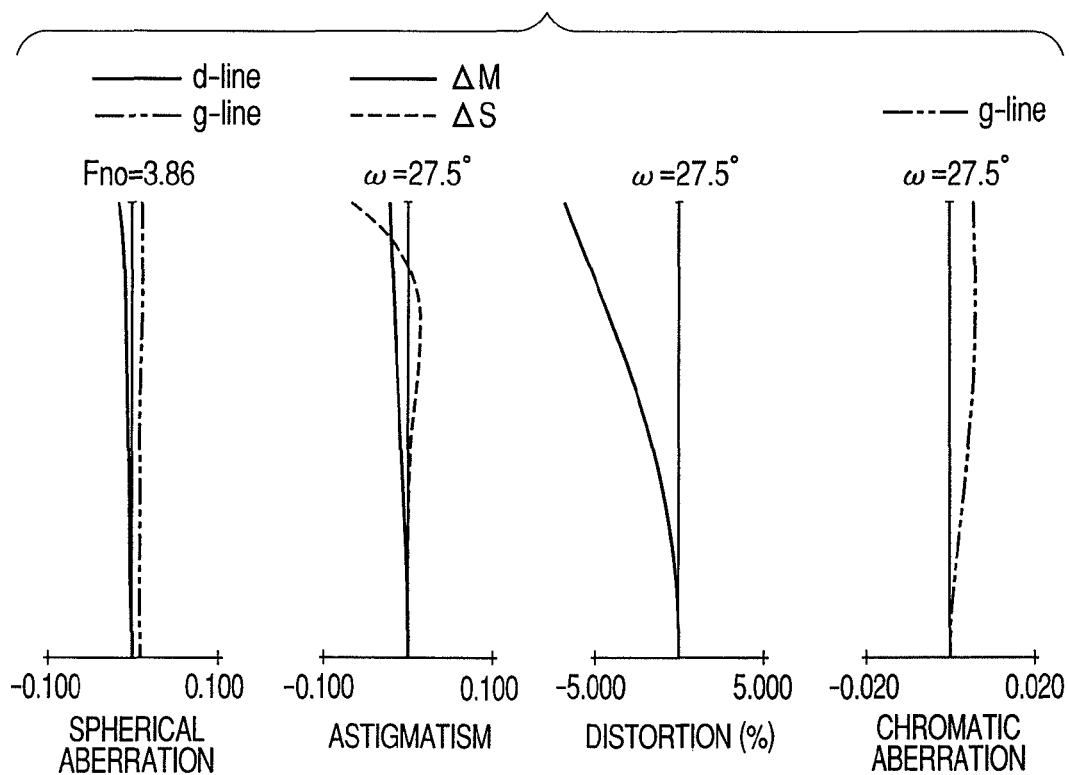
Figure 8C:
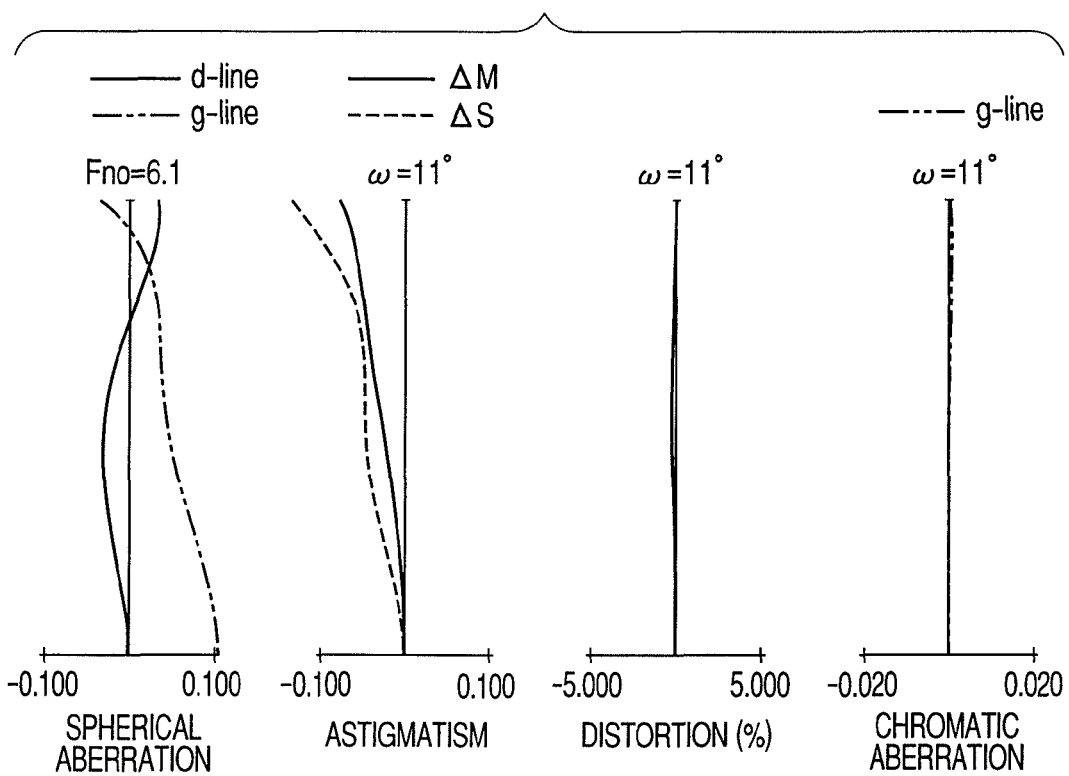

FIG. 5 is a lens cross-sectional view illustrating a zoom lens system according to a third embodiment of the present invention at the wide angle end. FIGS. 6A, 6B, and 6C are aberration graphs in the zoom lens system according to the third embodiment at the wide angle end, the intermediate zoom position, and the telephoto end, respectively. The third embodiment shows a zoom lens system that is about 4.75 in zoom ratio and about 2.73 to 6.06 in aperture ratio. FIG. 7 is a lens cross-sectional view illustrating a zoom lens system according to a fourth embodiment of the present invention at the wide angle end. FIGS. 8A, 8B, and 8C are aberration graphs in the zoom lens system according to the fourth embodiment at the wide angle end, the intermediate zoom position, and the telephoto end, respectively. The fourth embodiment shows a zoom lens system that is about 4.47 in zoom ratio and about 2.83 to 6.10 in aperture ratio.

Figure 10B:
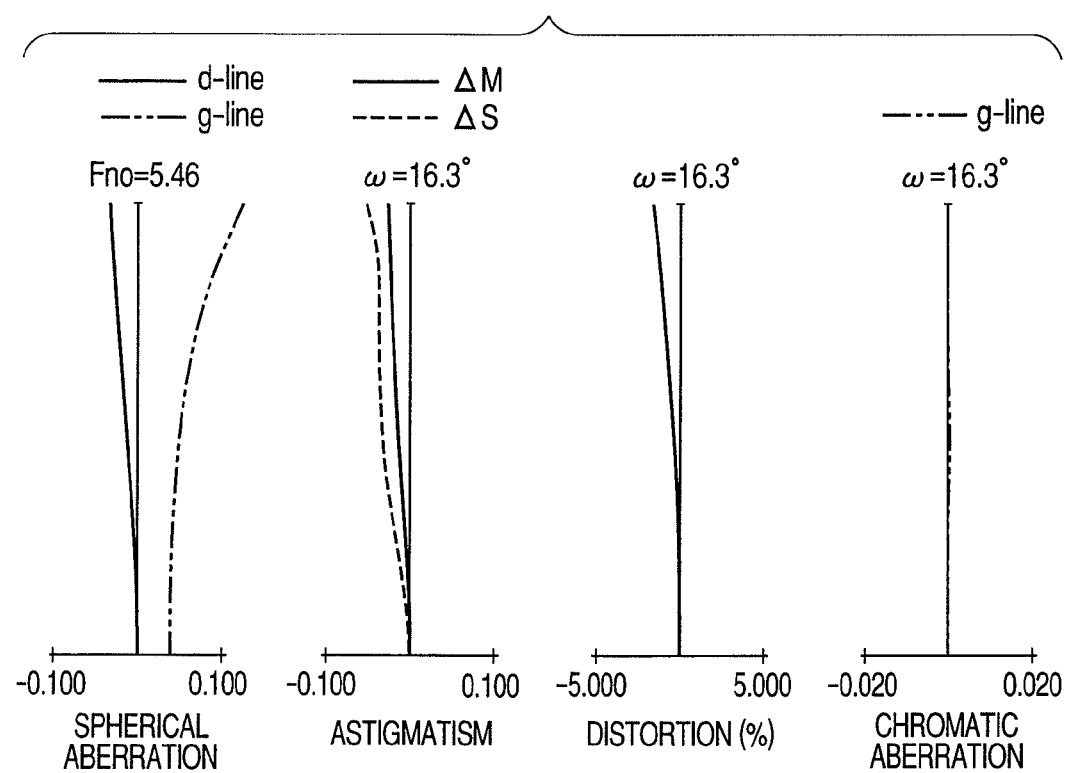
Figure 10C:
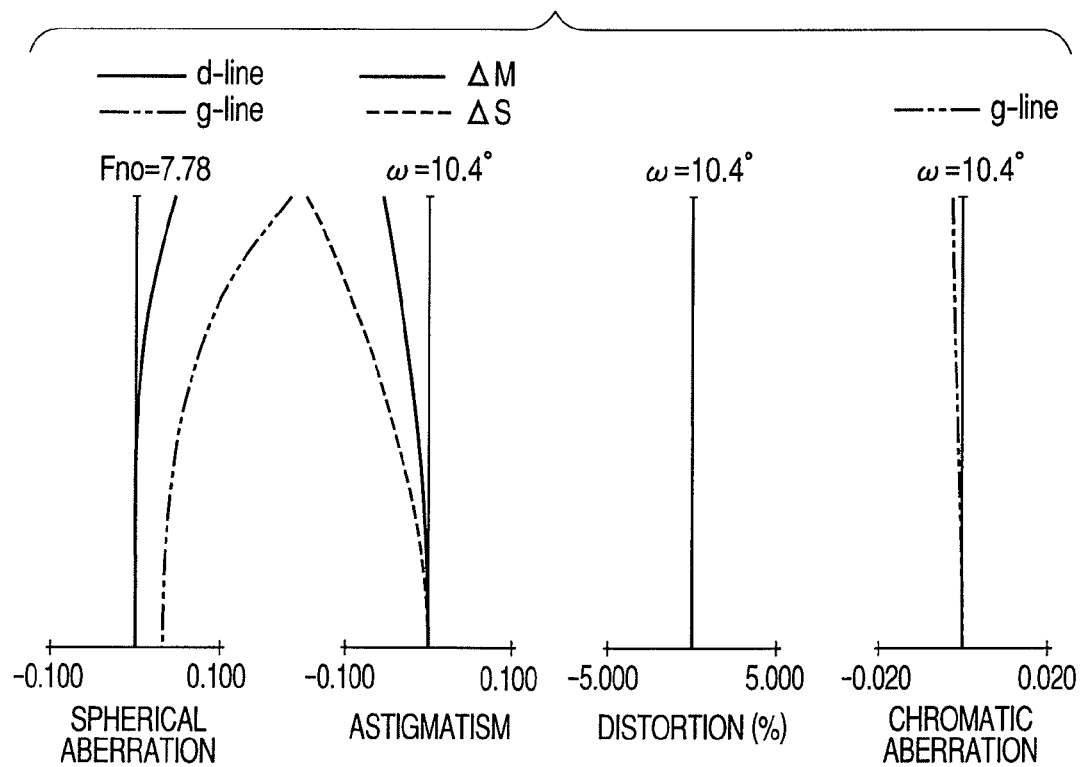
Figure 11:
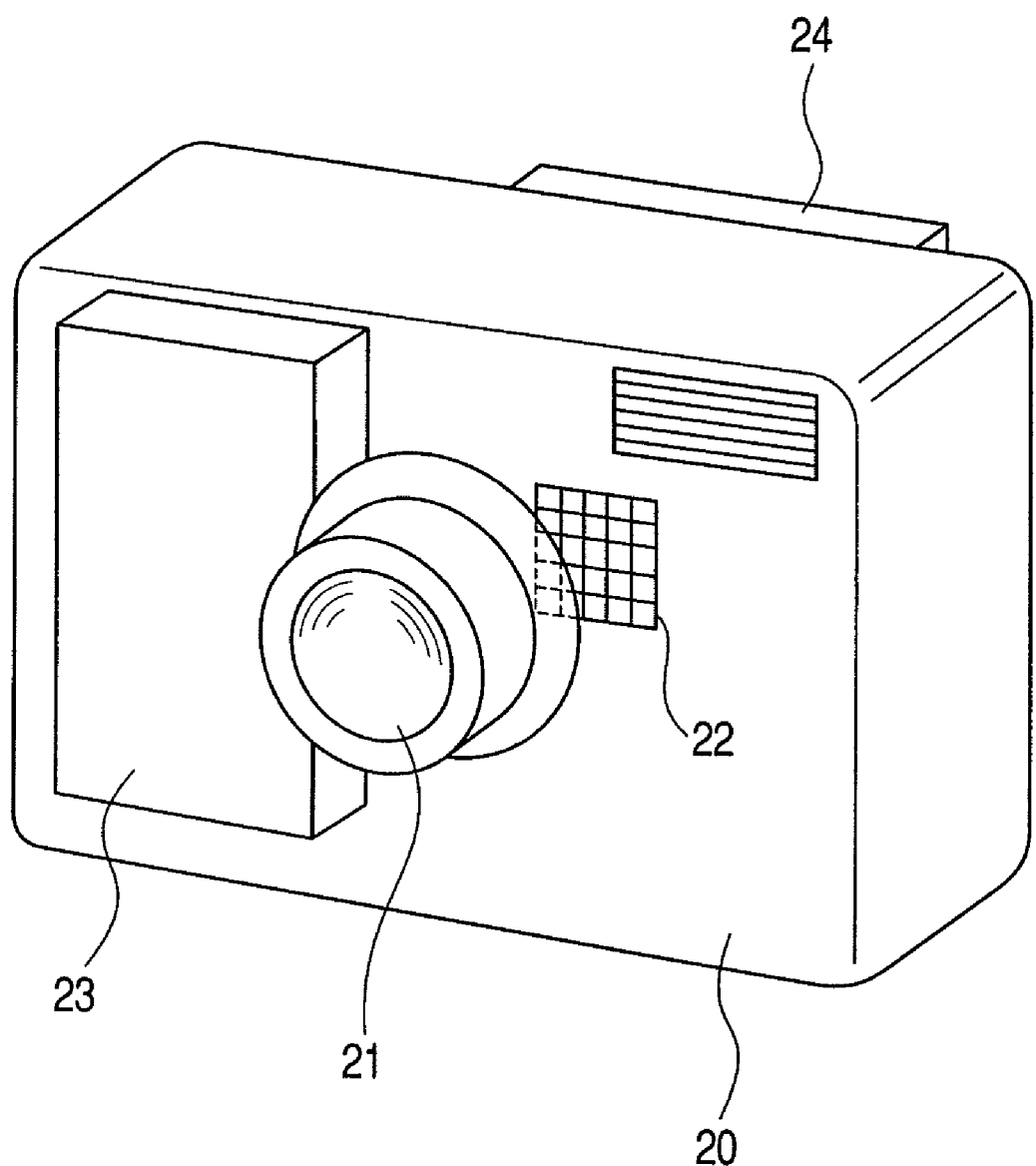
FIG. 11 is a schematic view illustrating a principal part of an image pickup apparatus according to the present invention.

FIG. 9 is a lens cross-sectional view of a zoom lens system according to a fifth embodiment of the present invention at the wide angle end. FIGS. 10A, 10B, and 10C are aberration graphs of the zoom lens system according to the fifth embodiment at the wide angle end, the intermediate zoom position, and the telephoto end, respectively. The sixth embodiment shows the zoom lens system that is about 4.63 in zoom ratio and about 2.88 to 7.78 in aperture ratio. FIG. 11 is a schematic diagram illustrating a main portion of a digital still camera including the zoom lens system of the present invention.

The zoom lens systems according to the respective embodiments are image taking lens systems for use in the image pickup apparatus. In the lens cross-sectional views, the left side is an object side (front), and the right side is an image side (rear). In the lens cross-sectional views, an order of the respective lens units from the object side toward the image side is represented by "i", and an i-th lens unit is represented by Li. The features of the zoom lens systems according to the first to fifth embodiments are described. In the lens cross-sectional views of FIGS. 1, 3, 5, 7, and 9, a first lens unit L1 has a negative refractive power (optical power=inverse of focal length), a second lens unit L2 has a positive refractive power, and a third lens unit L3 has the positive refractive power.

An F-number determination member SP (hereinafter, also referred to as "aperture stop") functions as an aperture stop for determining (limiting) an open F-number (Fno) light flux, and disposed on the image side of the second lens unit L2. An optical block G corresponds to an optical filter, a face plate, a crystal low pass filter, or an infrared cut-off filter. An image plane IP is provided. When the zoom lens system is used as the image taking optical system of the video camera or the digital still camera, an image pickup surface of a solid-state image pickup element (photoelectric transducer) such as a CCD sensor or a CMOS sensor is placed in the image plane IP.

When the zoom lens system is used as an image pickup optical system of a silver-halide film camera, a photosensitive film corresponding to a film surface is placed in the image plane IP. In the aberration graphs, an F-number is represented by Fno, a d-line and a g-line are represented by d and g, respectively, a meridional image plane and a sagittal image plane are represented by ΔM and ΔS, respectively, and a lateral chromatic aberration is represented by the g-line. A half field angle is represented by ω. In the following respective embodiments, the wide angle end and the telephoto end correspond to zoom positions in case where a lens unit for magnification varying (second lens unit L2) is located at both ends of a range in which the lens unit is movable on an optical axis in view of mechanisms.

In the zoom lens systems of the respective embodiments, during zooming from the wide angle end toward the telephoto end, the first lens unit L1 is substantially reciprocated along a locus convex toward the image side. The second lens unit L2 moves to the object side, and the third lens unit L3 moves to the image side. In this state, at the telephoto end, the respective lens units are moved so that an interval between the first lens unit L1 and the second lens unit L2 becomes small, and an interval between the second lens unit L2 and the third lens unit L3 becomes large as compared with the wide angle end, to perform zooming. The zoom lens system of each embodiment moves the second lens unit L2 to conduct main magnification varying, and reciprocates the first lens unit L1 to correct the movement of an image point caused by the magnification varying.

As compared with a case in which magnification varying is conducted also by the movement of the third lens unit L3 to perform magnification varying by one lens unit, the refractive power of each lens unit is prevented from increasing. Focusing onto a short-distance object from an infinite-distance object is performed by moving the third lens unit L3 toward the object side. The F-number determination member SP is disposed on the image side of the second lens unit L2 in the optical axial direction. With arrangement of the aperture stop SP as described above, the interval between the first lens unit L1 and the second lens unit L2 at the telephoto end may be reduced.

For that reason, an amount of movement of the second lens unit L2 toward the object side during zooming may be sufficiently ensured. As a result, a total length of the lens at the telephoto end may be shortened with a high zoom ratio. In the respective embodiments, an aperture dimension of the F-number determination member SP is changed on the respective zoom positions to determine the minimum Fno (F-number) at the respective zoom positions. As a result, a change in the F-number at the wide angle end and the telephoto end is reduced, and an effective diameter of the second lens unit L2 is prevented from increasing.

In the respective embodiments, the first lens unit L1 includes a first-first lens element G11 with a negative refractive power and a first-second lens element G12 with a positive refractive power arranged in order of from the object side. The first lens unit L1 includes the minimum number of lenses necessary to excellently correct the chromatic aberration, to thereby downsize the first lens unit L1. The first-first lens element G11 of the first lens unit L1 is made of a low dispersed material, and the first-second lens element G12 thereof is made of a high dispersed material to make the refractive powers of the first-first lens element G11 and the first-second lens element G12 as small as possible so as to reduce the thickness of the respective lenses. Further, the first-first lens element G11 and the first-second lens element G12 are made of a material high in refractive index to thin the first lens unit L1.

In the respective embodiments, it is assumed that the refractive index of the material of the first-first lens element G11 is N11, an Abbe number of the material of the first-second lens element G12 is ν12, and the radii of curvatures of lens surfaces of the first lens element on the object side and the image side are R11$a$ and R11$b$, respectively. In this case, the following conditional expressions are satisfied.

$$1.81 < N11 \tag{1}$$

$$\nu12 < 20.0 \tag{2}$$

$$0 < (R11a + R11b)/(R11a - R11b) \leq 1.0 \tag{3}$$

The conditional expression (1) relates to the refractive index of the material of the first-first lens element G11 that constitutes the first lens unit L1. When the refractive index is smaller than a lower limit of the conditional expression (1), a lens outer periphery becomes thicker in order to obtain a desired refractive power. Therefore, it is difficult to thin the first lens unit L1. Further, the field curvature frequently occurs on the wide angle side, and therefore the refractive index smaller than the lower limit of the conditional expression (1) is not desirable.

The conditional expression (2) relates to the Abbe number of the material of the first-second lens element G12 that constitutes the first lens unit L1. When the Abbe number is larger than an upper limit of the conditional expression (2), the refractive power of the first-second lens element G12 necessary to correct the chromatic aberration becomes high, and the first-second lens element G12 is thickened. Therefore, it is difficult to thin the first lens unit L1.

The conditional expression (3) relates to the lens configuration of the first-first lens element G11 that constitutes the first lens unit L1. In order to downsize the lens diameter of the first-first lens element (first front lens element) G11, it is preferred to arrange an entrance pupil position on the object side as much as possible. In order to achieve this arrangement, it is preferred that the lens surface of the first-first lens element G11 on the object side be not convex but concave toward the object side. When the lens surface on the object side exceeds an upper limit of the conditional expression (3), and provides an extreme meniscus configuration that is convex toward the object side, the entrance pupil position is located on the image side, and the lens diameter of the first-first lens element G11 increases. When the lens surface on the object side falls below a lower limit thereof, and provides a configuration that is concave toward the object side, and the curvature thereof increases, the field curvature increases on the wide angle side, and the spherical aberration increases on the telephoto side. Therefore, the increased curvature is not preferred. More preferably, numerical value ranges of the conditional expressions (1) and (3) may be set as follows:

$$1.825 < N11 \tag{1a}$$

$$v12 < 19 \tag{2a}$$

$$0.3 < (R11a + R11b)/(R11a - R11b) \leq 1.0 \tag{3a}$$

As described above, the respective embodiments may obtain the compact zoom lens system that reduces the lens diameter with a wide field angle that is 37° or more in the half field angle at the wide angle end, at a high zoom ratio that is 4 or more in zoom ratio. Further, it is preferred to satisfy one or more of the following various conditions.

It is assumed that the radius of curvature of the lens surface of the first-second lens element G12 that constitutes the first lens unit L1 on the image side is R12b. It is assumed that the radius of curvature of the lens surface of the first-second lens element G12 that constitutes the first lens unit L1 on the object side is R12a. It is assumed that the Abbe number of the material of the first-first lens element G11 that constitutes the first lens unit L1 is v11, and the refractive index of the material of the first-second lens element G12 is N12. It is assumed that the focal lengths of the first lens unit L1, the second lens unit L2, and the third lens unit L3 are f1, f2, and f3, respectively. It is assumed that the focal lengths of the entire system at the wide angle end and the telephoto end are fw and ft, respectively. It is assumed that the amount of movement of the second lens unit L2 extending from the wide angle end to the telephoto end in the optical axial direction is M2. It is assumed that the focal length of the first-second lens element G12 that constitutes the first lens unit L1 is f12. The second lens unit L2 includes a second-first lens element G21, whose surface on the object side is convex, closest to the object side, and it is assumed that the refractive index of a material of the second-first lens element G21 is N21. In this case, it is preferred to satisfy one or more of the following conditional expressions.

$$-0.5 < (R11a + R12b)/(R11a - R12b) 1.0 \tag{4}$$

$$-7.0 < (R11b + R12a)/(R11b - R12a) < -3.0 \tag{5}$$

$$30 < v11 < 50 \tag{6}$$

$$1.90 < N12 \tag{7}$$

$$0.3 < |f1|/ft < 0.6 \tag{8}$$

$$0.3 < f2/ft < 0.6 \tag{9}$$

$$0.6 < f3/ft < 1.2 \tag{10}$$

$$3.5 < M2/fw < 5.0 \tag{11}$$

$$1.4 < f12/|f1| < 2.5 \tag{12}$$

$$1.8 < N21 \tag{13}$$

The conditional expression (4) relates to the lens surface of the first-first lens element G11 that constitutes the first lens unit L1 on the object side and the lens surface of the first-second lens element G12 that constitutes the first lens unit L1 on the image side. That is, the conditional expression (4) relates to the configurations of an incident surface and an exit surface of the first lens unit L1. When the lens surfaces exceed an upper limit of the conditional expression (4), and both of the lens surface of the first-first lens element G11 on the object side and the lens surface of the first-second lens element G12 on the image side are convex toward the object side, the high-dimensional component of the spherical aberration frequently occurs on the telephoto side. When the lens surfaces fall below a lower limit of the conditional expression (4), and the curvature of the lens surface of the first-first lens element G11 on the object side is larger than that of the lens surface of the first-second lens element G12 on the image side, a principal point position of the first lens unit L1 is slanted on the object side. As a result, at the telephoto end, an interval between the first lens unit L1 and the second lens unit L2 becomes insufficient, which makes it difficult to realize the high zoom ratio.

The conditional expression (5) relates to a shape factor of an air lens including the first-first lens element G11 and the first-second lens element G12. The air lens that satisfies the conditional expression (5) is of a meniscus configuration that is convex toward the object side. When the shape factor exceeds an upper limit of the conditional expression (5), the field curvature and the astigmatism increase on the wide angle side. When the shape factor falls below a lower limit of the conditional expression (5), the spherical aberration and the axial chromatic aberration increase on the telephoto side.

The conditional expression (6) relates to the Abbe number of the material of the first-first lens element G11 that constitutes the first lens unit L1. When the Abbe number is larger than an upper limit of the conditional expression (6), that is, when the material has low dispersion, the refractive index becomes low in a general optical glass. Therefore, it is difficult to thin the first-first lens element G11. When the Abbe number is smaller than a lower limit of the conditional expression (6), that is, when the material has high dispersion, the lateral chromatic aberration increases at the wide angle end, and the axial chromatic aberration increases at the telephoto end.

The conditional expression (7) relates to the refractive index of the material of the first-second lens element G12 that constitutes the first lens unit L1. When the refractive index is smaller than a lower limit of the conditional expression (7), it is difficult to thin the first-second lens element G12. When the first-second lens element G12 is thick, an interval between the first lens unit L1 and the second lens unit L2 becomes insufficient at the telephoto end, which makes it difficult to realize the high zoom ratio.

The conditional expression (8) relates to the focal length of the first lens unit L1. When the focal length of the first lens unit L1 is longer than an upper limit of the conditional expression (8), the entire length of the lens (distance of from the first lens surface to the image surface) increases at the wide angle end. When the focal length of the first lens unit L1 is shorter than a lower limit of the conditional expression (8), various aberrations frequently occur in the first lens unit L1. In particular, the field curvature and the lateral chromatic aberration increase on the wide angle side, and the spherical aberration and the coma increase on the telephoto side.

The conditional expression (9) relates to the focal length of the second lens unit L2. When the focal length of the second lens unit L2 is longer than an upper limit of the conditional expression (9), the amount of movement of the second lens unit L2 necessary to obtain a desired zoom ratio is too large, and the entire length of the lens increases at the telephoto end. In particular, in a configuration where a lens barrel that holds the lens is collapsible, when attempt is made to shorten the length of the collapsible lens barrel, the lens barrel structure is complicated, and the unit is upsized and complicated. Therefore, the increased focal length of the second lens unit L2 is not preferred. When the focal length of the second lens unit L2 is shorter than a lower limit of the conditional expression (9), the various aberrations increase. In particular, the spherical aberration, the coma, and the axial chromatic aberration increase over the entire zoom range.

The conditional expression (10) relates to the focal length of the third lens unit L3. When the focal length of the third lens unit L3 is longer than an upper limit of the conditional expression (10), an incident angle to the image plane is too large because an action of bending an off-axis light flux is weakened. As a result, the efficiency of taking light in a solid-state image pickup element is deteriorated to increase shading. When the focal length of the third lens unit L3 is shorter than a lower limit of the conditional expression (10), various aberrations generated in the third lens unit L3 frequently occur. In particular, the lateral chromatic aberration and the field curvature increase over the entire zoom range. Because back focus is too short, it is difficult to ensure a space into which an optical member such as a low-pass filter or an infrared cut-off filter is inserted.

A conditional expression (11) relates to a movement distance (amount of movement, sign is positive) caused by zooming of the second lens unit L2. When the movement distance of the second lens unit L2 is longer than an upper limit of the conditional expression (11), the thickness of the lens barrel that holds the lens increases in the optical axial direction. In particular, when the lens barrel is collapsible, the length of the collapsible lens barrel increases, and it is difficult to configure a thin image pickup apparatus. When the movement distance of the second lens unit L2 is shorter than a lower limit of the conditional expression (11), the refractive power of the second lens unit L2 must be increased in order to obtain a desired zoom ratio (magnification varying ratio). In this case, it is difficult to correct the aberration by the reduced number of lenses, and it is difficult to perform downsizing and higher performance.

The conditional expression (12) relates to the focal length of the first-second lens element G12 of the first lens unit L1. When the focal length of the first-second lens element G12 is longer than an upper limit of the condition expression (12), correction to the chromatic aberration in the first lens unit L1 is short, and correction to the axial chromatic aberration and the lateral chromatic aberration is short over the entire zoom range. When the focal length of the first-second lens element G12 is remarkably shorter than a lower limit of the conditional expression (12), the spherical aberration and the coma increase on the telephoto side.

The conditional expression (13) defines the refractive index of the material of the second-first lens element G21 of the second lens unit L2 which is arranged closest to the object side. When the refractive index is lower than a lower limit of the conditional expression (13), the spherical aberration and the coma increase over the entire zoom range. As a result, it is difficult to excellently correct the aberration even if an aspheric surface is used. More preferably, numeric ranges of the conditional expressions (4) to (13) may be set as follows.

$$-0.4 < (R11a+R12b)/(R11a-R12b) \leq 1.0 \quad (4a)$$

$$-6.0 < (R11b+R12a)/(R11b-R12a) < -3.5 \quad (5a)$$

$$35 < v11 < 49 \quad (6a)$$

$$1.92 < N12 \quad (7a)$$

$$0.40 < |f1|/ft < 0.55 \quad (8a)$$

$$0.4 < f2/ft < 0.5 \quad (9a)$$

$$0.7 < f3/ft < 1.1 \quad (10a)$$

$$3.7 < M2/fw < 4.8 \quad (11a)$$

$$1.45 < f12/|f1| < 2.3 \quad (12a)$$

$$1.82 < N21 \quad (13a)$$

The specific features of the lens configuration of the respective lens units are described below. In the first to fifth embodiments, the first lens unit L1 is made up of the first-first lens element G11 with a negative refractive power, whose surface on the image side is of the concave configuration, and the first-second lens element G12 with a positive refractive power, whose surface on the object side is of the convex and meniscus configuration, arranged in order of from the object side toward the image side. With the above-mentioned configuration, the various aberrations are excellently corrected while the first lens unit L1 is made up of two lenses, and the entire lens system is downsized.

In the first embodiment, the second lens unit L2 includes a cemented lens in which the second-first lens element G21 with the positive refractive power, whose surface on the object side is of the convex and meniscus configuration, is joined to a second-second lens element G22 with the negative refractive power, whose surface on the object side is of the convex and meniscus configuration, arranged in order of from the object side toward the image side. The second lens unit L2 also includes a cemented lens in which a second-third lens element G23 with the negative refractive power, whose surface on the object side is of the convex and meniscus configuration, is joined to a second-fourth lens element G24 with a biconvex configuration. In the second, third, and fourth embodiments, the second lens unit L2 includes the second-first lens element G21 with the positive refractive power, whose surface on the object side is convex, a cemented lens in which the second-second lens element G22 with the positive refractive power, whose surface on the object side is convex, is joined to the second-third lens element G23 with the negative refractive power, whose surface on the image side is concave, and the second-fourth lens element G24 with the positive refractive power.

In the fifth embodiment, the second lens unit L2 includes a cemented lens in which the second-first lens element G21 with the positive refractive power, whose surface on the object side is convex, is joined to the second-second lens element G22 with the negative refractive power, whose surface on the image side is concave, and the second-third lens element G23 with the positive refractive power. The second lens unit L2 is configured as described above so that the chromatic aberration and the off-axis aberration are reduced, and the spherical aberration, the coma, and the like are excellently corrected. The third lens unit L3 functions as a field lens for ensuring the telecentric property, and is made up of a single third-first lens element G31 with the positive refractive power, which is of a biconvex configuration.

Next, numerical embodiments corresponding to each of the embodiments according to the present invention are described. In the numerical embodiments, a surface number "i" is counted from the object side. In the numerical embodiments, ri represents a curvature radius of an i-th lens surface counted from the object side and di represents a lens thickness and an air interval of the i-th surface which is counted from the object side. Further, ndi and vdi represent a refractive index and Abbe number, respectively, of a material of an i-th glass counted from the object side with respect to the d-line. Table 1 illustrates relationships between the respective conditional expressions described above and the respective numerical embodiments. Assume that the optical axis direction is an X-axis, a direction perpendicular to the optical axis is an H axis, and a light traveling direction is positive. In this case, when a paraxial curvature radius is represented by R, a conic constant is represented by K, and aspherical coefficients are represented by A4, A6, A8, A10, and A12, an aspherical shape is expressed by the following expression.

$$X = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12}$$

[Equation 1]

$[e^{+X}]$ means $[\times 10^{+x}]$, and $[e^{-X}]$ means $[\times 10^{-x}]$. A value obtained by converting a distance (back focus) of from the lens rear surface to the paraxial image plane by air is represented by BF. The total length of the lens is obtained by adding BF to a distance of from the lens front surface to the lens rear surface. The aspherical surface is indicated by adding * to the rear of the surface number.

[Numerical Embodiment 1]
Unit mm

Surface data

| Surface number | r | d | nd | vd |
|---|---|---|---|---|
| 1 | ∞ | 1.05 | 1.84954 | 40.1 |
| 2* | 5.155 | 1.23 | | |
| 3 | 7.963 | 1.70 | 1.94595 | 18.0 |
| 4 | 15.503 | (Variable) | | |
| 5* | 3.830 | 1.70 | 1.84954 | 40.1 |
| 6 | 35.088 | 0.50 | 1.80518 | 25.4 |
| 7 | 3.228 | 0.80 | | |
| 8 | 11.664 | 0.50 | 1.69895 | 30.1 |
| 9 | 5.759 | 2.00 | 1.77250 | 49.6 |
| 10 | −22.085 | 0.50 | | |
| 11 (Stop) | ∞ | (Variable) | | |
| 12 | 19.146 | 1.42 | 1.69680 | 55.5 |
| 13 | −56.741 | (Variable) | | |
| Image plane | ∞ | | | |

Aspherical surface data

Second surface

K = −1.67969e+000  A4 = 9.52304e−004  A6 = −6.12005e−006
A8 = 1.59433e−007  A10 = −1.36767e−009  A12 = 0

Fifth surface

K = −1.15224e+000  A4 = 1.76183e−003  A6 = 3.52146e−005
A8 = 1.84936e−006  A10 = −6.49465e−008  A12 = 1.00000e−008

Various data
Zoom ratio 4.71

| | Wide angle | Intermediate | Telephoto |
|---|---|---|---|
| Focal length | 4.43 | 10.97 | 20.85 |
| F-number | 2.94 | 5.14 | 6.00 |
| Field angle | 37.59 | 19.46 | 10.53 |
| Image height | 3.41 | 3.88 | 3.88 |
| Total lens length | 32.07 | 29.88 | 37.59 |
| BF | 4.19 | 3.88 | 3.42 |
| d4 | 13.00 | 3.30 | 0.17 |
| d11 | 3.47 | 11.31 | 22.59 |
| d13 | 4.19 | 3.88 | 3.42 |
| d15 | 1.02 | 1.02 | 1.02 |

Zoom lens unit data

| Lens unit | First surface | Focal length |
|---|---|---|
| 1 | 1 | −10.37 |
| 2 | 5 | 9.19 |
| 3 | 12 | 20.70 |

[Numerical Embodiment 2]

Surface data

| Surface number | r | d | nd | vd |
|---|---|---|---|---|
| 1* | −80.129 | 1.05 | 1.84954 | 40.1 |
| 2* | 5.455 | 1.84 | | |
| 3 | 9.481 | 1.70 | 1.92286 | 18.9 |
| 4 | 20.781 | (Variable) | | |
| 5* | 5.694 | 1.56 | 1.84954 | 40.1 |
| 6 | 72.752 | 0.20 | | |
| 7 | 7.145 | 1.10 | 1.69680 | 55.5 |
| 8 | −39.682 | 0.40 | 1.80518 | 25.4 |
| 9 | 3.743 | 0.82 | | |
| 10 | 55.891 | 0.90 | 1.69680 | 55.5 |
| 11 | −17.093 | 0.50 | | |
| 12 (Stop) | ∞ | (Variable) | | |
| 13* | 53.691 | 1.70 | 1.69350 | 53.2 |
| 14 | −19.657 | (Variable) | | |
| Image plane | ∞ | | | |

[Numerical Embodiment 2]

Aspherical surface data

First surface

K = −6.85575e+001   A4 = 3.78622e−005   A6 = 2.02360e−006
A8 = −4.70081e−008  A10 = 2.52815e−010  A12 = 0

Second surface

K = −2.49393e+000   A4 = 1.44227e−003   A6 = −1.94554e−005
A8 = 6.60863e−007   A10 = −1.17492e−008 A12 = 0

Fifth surface

K = −2.51823e−001   A4 = −2.88572e−004  A6 = −6.45912e−006
A8 = 2.41205e−007   A10 = −1.45631e−008 A12 = 0

Thirteenth surface

K = −8.66414e+002   A4 = 4.57251e−004   A6 = −3.29303e−005
A8 = 1.21213e−006   A10 = −1.83080e−008 A12 = 0

Various data
Zoom ratio 4.72

|  | Wide angle | Intermediate | Telephoto |
|---|---|---|---|
| Focal length | 4.42 | 7.64 | 20.85 |
| F-number | 2.88 | 3.98 | 6.05 |
| Field angle | 37.00 | 26.88 | 10.53 |
| Image height | 3.33 | 3.88 | 3.88 |
| Total lens length | 32.56 | 29.36 | 38.45 |
| BF | 4.17 | 4.12 | 3.93 |
| d4 | 13.34 | 6.39 | 0.35 |
| d12 | 3.28 | 7.07 | 22.40 |
| d14 | 4.17 | 4.12 | 3.93 |
| d16 | 1.00 | 1.00 | 1.00 |

Zoom lens unit data

| Lens unit | First surface | Focal length |
|---|---|---|
| 1 | 1 | −10.07 |
| 2 | 5 | 9.22 |
| 3 | 13 | 20.95 |

[Numerical Embodiment 3]

Surface data

| Surface number | r | d | nd | vd |
|---|---|---|---|---|
| 1* | −40.730 | 1.05 | 1.90000 | 48.0 |
| 2* | 6.281 | 2.12 | | |
| 3 | 10.941 | 1.70 | 1.94595 | 18.0 |
| 4 | 22.988 | (Variable) | | |
| 5* | 5.891 | 1.56 | 1.90000 | 48.0 |
| 6 | 61.833 | 0.20 | | |
| 7 | 7.014 | 1.10 | 1.69680 | 55.5 |
| 8 | 376.377 | 0.40 | 1.80518 | 25.4 |
| 9 | 3.749 | 0.80 | | |
| 10 | 378.272 | 0.90 | 1.69680 | 55.5 |
| 11 | −14.946 | 0.50 | | |
| 12 (Stop) | ∞ | (Variable) | | |
| 13* | 47.747 | 1.70 | 1.69350 | 53.2 |
| 14 | −16.572 | (Variable) | | |
| Image plane | ∞ | | | |

Aspherical surface data

First surface

K = −2.56017e+002   A4 = 9.66865e−005   A6 = 1.86470e−006
A8 = −5.59595e−008  A10 = 3.31152e−010  A12 = 0

[Numerical Embodiment 3]

Second surface

K = −2.50216e+000   A4 = 1.42822e−003   A6 = −2.45712e−005
A8 = 9.94260e−007   A10 = −1.78646e−008 A12 = 0

Fifth surface

K = −2.34319e−001   A4 = −3.16178e−004  A6 = −6.54470e−006
A8 = 7.77388e−007   A10 = −4.10861e−008 A12 = 0

Thirteenth surface

K = −6.59795e+002   A4 = 3.95186e−004   A6 = −3.30974e−005
A8 = 1.21213e−006   A10 = −1.83080e−008 A12 = 0

Various data
Zoom ratio 4.75

|  | Wide angle | Intermediate | Telephoto |
|---|---|---|---|
| Focal length | 4.02 | 7.03 | 19.10 |
| F-number | 2.73 | 3.81 | 6.06 |
| Field angle | 39.65 | 28.88 | 11.47 |
| Image height | 3.33 | 3.88 | 3.88 |
| Total lens length | 32.22 | 29.16 | 38.63 |
| BF | 4.00 | 4.02 | 3.92 |
| d4 | 13.05 | 6.19 | 0.42 |
| d12 | 3.12 | 6.91 | 22.24 |
| d14 | 4.00 | 4.02 | 3.92 |
| d16 | 1.00 | 1.00 | 1.00 |

Zoom lens unit data

| Lens unit | First surface | Focal length |
|---|---|---|
| 1 | 1 | −9.35 |
| 2 | 5 | 9.04 |
| 3 | 13 | 17.93 |

[Numerical Embodiment 4]

Surface data

| Surface number | r | d | nd | vd |
|---|---|---|---|---|
| 1* | −20.005 | 1.05 | 1.83000 | 42.0 |
| 2* | 7.031 | 2.02 | | |
| 3 | 11.901 | 1.70 | 1.92286 | 18.9 |
| 4 | 35.445 | (Variable) | | |
| 5* | 5.460 | 1.56 | 1.83000 | 42.0 |
| 6 | 2137.403 | 0.20 | | |
| 7 | 7.682 | 1.10 | 1.69680 | 55.5 |
| 8 | −41.260 | 0.40 | 1.80518 | 25.4 |
| 9 | 3.553 | 0.82 | | |
| 10 | 25.890 | 0.90 | 1.69680 | 55.5 |
| 11 | −57.751 | 0.50 | | |
| 12 (Stop) | ∞ | (Variable) | | |
| 13* | 45.596 | 1.70 | 1.69350 | 53.2 |
| 14 | −15.839 | (Variable) | | |
| Image plane | ∞ | | | |

Aspherical surface data

First surface

K = −4.91130e+001   A4 = 9.27734e−005   A6 = 2.92261e−006
A8 = −8.67939e−008  A10 = 5.40258e−010  A12 = 0

Second surface

K = −2.36588e+000   A4 = 1.34626e−003   A6 = −2.27576e−005
A8 = 9.43910e−007   A10 = −1.87509e−008 A12 = 0

[Numerical Embodiment 4]

Fifth surface

K = −2.55556e−001  A4 = −3.61259e−004  A6 = −7.91650e−006
A8 = 4.71901e−007  A10 = −3.04645e−008  A12 = 0

Thirteenth surface

K = −4.08129e+002  A4 = 4.18136e−004  A6 = −3.33793e−005
A8 = 1.21214e−006  A10 = −1.83080e−008  A12 = 0

Various data
Zoom ratio 4.47

|  | Wide angle | Intermediate | Telephoto |
|---|---|---|---|
| Focal length | 4.44 | 7.43 | 19.85 |
| F-number | 2.83 | 3.86 | 6.10 |
| Field angle | 36.89 | 27.54 | 11.05 |
| Image height | 3.33 | 3.88 | 3.88 |
| Total lens length | 33.63 | 30.45 | 39.13 |
| BF | 4.22 | 4.15 | 3.92 |
| d4 | 14.12 | 7.23 | 0.80 |
| d12 | 3.33 | 7.13 | 22.46 |
| d14 | 4.22 | 4.15 | 3.92 |
| d16 | 1.00 | 1.00 | 1.00 |

Zoom lens unit data

| Lens unit | First surface | Focal length |
|---|---|---|
| 1 | 1 | −10.64 |
| 2 | 5 | 9.77 |
| 3 | 13 | 17.15 |

[Numerical Embodiment 5]
Unit mm

Surface data

| Surface number | r | d | nd | vd |
|---|---|---|---|---|
| 1* | −51.347 | 1.05 | 1.84954 | 40.1 |
| 2* | 6.285 | 1.61 | | |
| 3 | 9.383 | 1.90 | 2.20000 | 17.0 |
| 4 | 14.794 | (Variable) | | |
| 5* | 4.321 | 1.70 | 2.00000 | 40.0 |
| 6 | 26.092 | 0.50 | 1.80809 | 22.8 |
| 7 | 3.296 | 0.60 | | |
| 8* | 13.224 | 1.30 | 1.77250 | 49.6 |
| 9* | −22.061 | 0.50 | | |
| 10 (Stop) | ∞ | (Variable) | | |
| 11 | 17.492 | 1.42 | 1.69680 | 55.5 |
| 12 | −66.105 | (Variable) | | |
| Image plane | ∞ | | | |

Aspherical surface data

First surface

K = −5.52558e+002  A4 = 1.17613e−004  A6 = 1.69941e−006
A8 = −6.18420e−008  A10 = 4.01512e−010  A12 = 0

Second surface

K = −1.68185e+000  A4 = 1.17631e−003  A6 = −1.82191e−005
A8 = 9.43969e−007  A10 = −1.81545e−008  A12 = 0

Fifth surface

K = −1.08494e+000  A4 = 1.06827e−003  A6 = 1.19765e−005
A8 = 7.99367e−007  A10 = −3.06143e−009  A12 = 1.00000e−008

Eighth surface

K = 1.23124e+001  A4 = 4.58023e−009  A6 = 4.58023e−011
A8 = 4.58023e−013  A10 = 4.58023e−015  A12 = 0

[Numerical Embodiment 5]
Unit mm

Ninth surface

K = 1.56985e+001  A4 = 5.15497e−004  A6 = −4.33305e−005
A8 = 6.72224e−013  A10 = 6.72224e−015  A12 = 0

Various data
Zoom ratio 4.63

|  | Wide angle | Intermediate | Telephoto |
|---|---|---|---|
| Focal length | 4.55 | 13.23 | 21.07 |
| F-number | 2.88 | 5.46 | 7.78 |
| Field angle | 36.88 | 16.32 | 10.42 |
| Image height | 3.41 | 3.88 | 3.88 |
| Total lens length | 32.72 | 31.09 | 37.50 |
| BF | 3.60 | 3.58 | 3.56 |
| d4 | 13.64 | 2.46 | 0.29 |
| d10 | 4.91 | 14.48 | 23.08 |
| d12 | 3.60 | 3.58 | 3.56 |
| d14 | 1.24 | 1.24 | 1.24 |

Zoom lens unit data

| Lens unit | First surface | Focal length |
|---|---|---|
| 1 | 1 | −10.67 |
| 2 | 5 | 9.23 |
| 3 | 11 | 19.99 |

A relationship between the above-mentioned respective conditional expressions and various numerical values in the numerical embodiments is shown in Table 1.

TABLE 1

| Conditional expression | Numerical Example | | | | |
|---|---|---|---|---|---|
| | 1 | 2 | 3 | 4 | 5 |
| (1) | 1.84954 | 1.84954 | 1.90000 | 1.83000 | 1.84954 |
| (2) | 18.0 | 18.9 | 18.0 | 18.9 | 17.0 |
| (3) | 1.000 | 0.873 | 0.733 | 0.480 | 0.782 |
| (4) | 1.000 | 0.588 | 0.278 | −0.278 | 0.553 |
| (5) | −4.671 | −3.709 | −3.696 | −3.888 | −5.058 |
| (6) | 40.1 | 40.1 | 48.0 | 42.0 | 40.1 |
| (7) | 1.94595 | 1.92286 | 1.94595 | 1.92286 | 2.20000 |
| (8) | 0.497 | 0.483 | 0.490 | 0.536 | 0.506 |
| (9) | 0.441 | 0.442 | 0.474 | 0.492 | 0.438 |
| (10) | 0.962 | 1.004 | 0.939 | 0.864 | 0.949 |
| (11) | 4.143 | 4.266 | 4.735 | 4.240 | 3.989 |
| (12) | 1.504 | 1.749 | 2.209 | 1.764 | 1.682 |
| (13) | 1.84954 | 1.84954 | 1.90000 | 1.83000 | 2.00000 |

Next, a digital still camera (image pickup apparatus) according to an embodiment of the present invention in which the zoom lens system according to the present invention is used as an image taking optical system is described with reference to FIG. 11. In FIG. 11, the digital still camera includes a camera main body 20 and an image taking optical system 21 configured by the zoom lens system according to the present invention. A solid-state image pickup element (photoelectric transducer) 22 such as a CCD sensor or a CMOS sensor is incorporated in the camera main body 20 and receives light of an object image formed by the image taking optical system 21. A memory 23 records information corresponding to the object image photoelectrically converted by the solid-state image pickup element 22. A finder 24 includes a liquid crystal display panel and the like and is used for observing the object image formed on the solid-state image pickup element 22. The zoom lens system according to the present invention is applied to an image pickup apparatus such as the digital still camera, whereby a small image pickup apparatus having high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-085554, filed Mar. 31, 2009, which is hereby incorporated by reference herein in its entirety.

What is claimed is:

1. A zoom lens system, comprising, in order of from an object side toward an image side:
   a first lens unit with a negative refractive power;
   a second lens unit with a positive refractive power; and
   a third lens unit with the positive refractive power,
   the first lens unit, the second lens unit, and the third lens unit moving to perform zooming,
   wherein the first lens unit includes a first lens element with the negative refractive power, and a second lens element with the positive refractive power in order of from the object side toward the image side, and
   wherein when a refractive index of a material of the first lens element is $N11$, an Abbe number of a material of the second lens element is $\nu 12$, and the radii of curvatures of lens surfaces of the first lens element on the object side and the image side are $R11a$ and $R11b$, respectively, the following conditions are satisfied:

$1.81 < N11;$ $\nu 12 < 19;$ and $0 < (R11a + R11b)/(R11a - R11b) \leq 1.0.$

2. A zoom lens system according to claim 1, wherein when a radius of curvature of a lens surface of the second lens element on the image side is $R12b$, the following condition is satisfied $-0.5 < (R11a + R12b)/(R11a - R12b) \leq 1.0.$ 3. A zoom lens system according to claim 1, wherein when a radius of curvature of a lens surface of the second lens element on the object side is $R12a$, the following condition is satisfied $-7.0 < (R11b + R12a)/(R11b - R12a) \leq -3.0.$ 4. A zoom lens system according to claim 1, wherein when an Abbe number of the material of the first lens element is $\nu 11$, and a refractive index of the material of the second lens element is $N12$, the following conditions are satisfied:

$30 < \nu 11 < 50;$ $1.90 < N12.$

5. A zoom lens system according to claim 1, wherein when a focal length of the first lens unit is $f1$, and a focal length of an entire system at a telephoto end is $ft$, the following condition is satisfied $0.3 < |f1|/ft < 0.6.$ 6. A zoom lens system according to claim 1, wherein when a focal length of the second lens unit is $f2$, and a focal length of an entire system at a telephoto end is $ft$, the following condition is satisfied $0.3 < f2/ft < 0.6.$ 7. A zoom lens system according to claim 1, wherein when a focal length of the third lens unit is $f3$, and a focal length of an entire system at a telephoto end is $ft$, the following condition is satisfied $0.6 < f3/ft < 1.2.$ 8. A zoom lens system according to claim 1, wherein when a movement distance extending from a wide angle end to a telephoto end of the second lens unit in an optical axial direction is $M2$, and a focal length of an entire system at the wide angle end is $fw$, the following condition is satisfied $3.5 < M2/fw < 5.0.$ 9. A zoom lens system according to claim 1, wherein when a focal length of the second lens element is $f12$, and a focal length of the first lens unit is $f1$, the following condition is satisfied $1.4 < f12/|f1| < 2.5.$ 10. A zoom lens system according to claim 1, wherein when the second lens unit includes a third lens element with the positive refractive power, whose surface on the object side is convex, closest to the object side, and when a refractive index of a material of the third lens element is $N21$, the following condition is satisfied $1.8 < N21.$ 11. A zoom lens system according to claim 1, wherein the third lens unit moves to the object side when focusing onto a short-distance object from an infinite object.

12. An image pickup apparatus, comprising:
    the zoom lens system according to claim 1; and
    a solid-state image pickup element for receiving an image formed by the zoom lens system.

* * * * *